United States Patent [19]

de Haan et al.

[11] Patent Number: 5,071,633
[45] Date of Patent: Dec. 10, 1991

[54] METHOD OF IMPROVING HANDLING CHARACTERISTICS OF FROTH OF ELEMENTAL SULFUR PARTICLES

[75] Inventors: Robert de Haan, Sasolburg; Horst J. F. A. Hesse, Vanderbijlpark, both of South Africa; Sonet Vermaire, Middleburg, Netherlands; Sandra R. Wootton, Johannesburg, South Africa

[73] Assignee: Linde Aktiengesellschaft, Wiesbaden, Fed. Rep. of Germany

[21] Appl. No.: 366,710

[22] Filed: Jun. 15, 1989

[30] Foreign Application Priority Data

Jun. 15, 1988 [ZA] South Africa .................. 88/4263

[51] Int. Cl.$^5$ .................. C01B 17/027; C01B 17/05
[52] U.S. Cl. .................. 423/576.2; 23/293 S; 423/265
[58] Field of Search .............. 23/293 S, 308 S, 313 R; 423/265, 269, 274, 275, 567 R, 576.2, 578 R, 578 A

[56] References Cited

U.S. PATENT DOCUMENTS

| | | | |
|---|---|---|---|
| 1,697,402 | 1/1929 | Nutter et al. | 23/308 S |
| 2,352,519 | 6/1944 | Costa et al. | 423/567 R |
| 4,374,104 | 2/1983 | Primack | 423/576.2 |
| 4,508,537 | 4/1985 | Fenton et al. | 423/576.2 |
| 4,537,752 | 8/1985 | Weber | 423/576.6 |
| 4,909,945 | 3/1990 | Delaney | 423/576 R |

*Primary Examiner*—Jeffrey E. Russel
*Attorney, Agent, or Firm*—Millen, White & Zelano

[57] ABSTRACT

To improve the handling characteristics and dispersibility of a sulfur containing froth, especially a froth obtained from the regeneration step in a process for scrubbing out and oxidizing H$_2$S, there is added to the scrubbing liquor an ionic or non-ionic surfactant, e.g., dioctyl or dodecyl sulfosucciniate in sufficient concentrations, e.g., 3–16 ppm, to substantially prevent the sulfur particles from becoming crusty and stiff, this technique being particularly applicable to the replacement of diethanolamine.

23 Claims, No Drawings

METHOD OF IMPROVING HANDLING CHARACTERISTICS OF FROTH OF ELEMENTAL SULFUR PARTICLES

BACKGROUND OF THE INVENTION

This invention relates to a step of removing sulfur from a froth, said step being preferably embodied in a process for the removal of hydrogen sulfide from gas streams by means of a regenerable scrubbing solution adapted to preferentially oxidize the sulfur of the hydrogen sulfide to elemental sulfur. Thus, the invention particularly relates to a method of improving the separation of elemental sulfur from the aforementioned scrubbing solution, and especially to improving the characteristics of a flotation froth containing particulate sulfur so it can be readily dispersed in a slurry.

Various processes such as the Stretford process and the Takahax process have been developed for the removal of hydrogen sulfide from gas streams containing about 1 to 2 percent of hydrogen sulfide. A common feature of these processes is that the gas stream is contacted with an aqueous solution adapted to absorb the hydrogen sulfide and to oxidize the sulfide to elemental sulfur, whereafter the solution is regenerated in an oxidizer by bubbling air therethrough. The sulfur formed during the contacting step is removed from the solution in the oxidizer as a froth which is then processed further into a saleable product. The froth processing steps generally include a slurrying step where the froth is dispersed as a readily filterable slurry. The resultant slurry is then generally filtered by a conventional filter, e.g., a plate and frame filter.

The flotation of the elemental sulfur particles from the solution as well as the further handling thereof present certain difficulties. U.S. Pat. No. 4,508,537 describes a method of improving the removal of sulfur particles for the scrubbing solution of a Stretford process in which a non-ionic surfactant together with diesel oil are used in a ratio of one to the other of from 7:1 to 1:7. This combination of additives was claimed to have had a dramatic effect on the efficiency of the flotation step but no mention is made in U.S. Pat. No. 4,508,537 of the influence of the said additives on the ease of handling or manipulation of the froth obtained. In this regard, reference is particularly directed to the phenomenon of the tendency of the sulfur in the froth to become crusty and stiff, i.e., the froth is low in scrubbing liquor content. This results in the formation of lumps which are almost impossible to pump to the plate filter. This phenomenon is in contradistinction to the tendency of sulfur particles to fall out of the washing solution and deposit in the circulating equipment as described in U.S. Pat. No. 4,508,537. (The terms "scrubbing", "washing" and "absorbing" may be used interchangeably.)

It has been discovered by the present inventors that in a process in which diethanolamine has been eliminated in accordance with Republic of South Africa Patent No. 87/3112, problems of the kind described above are experienced with regard to the handling properties of the sulfur froth after separation thereof from the washing liquor, but, conversely, little difficulty was experienced with regard to the flotation of the elemental sulfur particles from the scrubbing solution. It became clear that, while the presence of diethanolamine under the process conditions previously applicable to the known process had no effect on the absorption and reoxidation stages, it did play the role of a wetting agent, albeit not a very efficient one. It therefore became desirable to investigate the use of alternative, preferably more cost-effective wetting agents to substitute for diethanolamine with a view to eliminate the problems encountered in the handling and manipulation of the froth described above.

SUMMARY OF THE INVENTION

An object of one aspect of the invention is to provide a method of preventing the sulfur in the froth from becoming crusty and stiff, preferably in the context of a comprehensive process for the removal of hydrogen sulfide from a gaseous stream.

Upon further study of the specification and appended claims, further objects and advantages of this invention will become apparent to those skilled in the art.

The comprehensive process comprises the steps of:

contacting the gas stream in an absorber in a regenerable scrubbing solution adapted to absorb and preferentially oxidize the sulfur of the hydrogen sulfide to particles of elemental sulfur;

transferring the scrubbing liquor to an oxidizer;

bubbling an oxygen containing gas through the liquor so as to regenerate the liquor and to cause the sulfur particles to rise upwardly through the liquor so as to float thereon as a layer of froth;

separating the froth layer containing the sulfur particles from the liquor;

returning the liquor to the absorber;

dispersing the separated froth into an aqueous slurry; and separating the sulfur from the slurry, the improvement which comprises adding to the regenerable scrubbing solution a sufficient amount of water soluble ionic or non-ionic surfactant in a suitable concentration selected to substantially prevent the sulfur particles from becoming crusty and stiff.

According to a broad aspect of the invention, there is provided a method of improving the ease of handling and manipulation of a froth comprising elemental sulfur, preferably a froth recovered from a scrubbing solution used in a process for the removal of hydrogen sulfide from a gas stream, comprising the step of adding to the liquid from which the froth is generated, e.g., the scrubbing solution, a sufficient amount of an ionic or non-ionic surfactant in a suitable concentration selected to substantially prevent the sulfur particles from becoming crusty and stiff.

According to a feature of the invention, the use of diethanolamine is not necessary but, if used, is preferably present in a non-essential amount (the liquor is essentially free of diethanolamine) as a wetting agent, and more preferably is not used at all—as economic conditions dictate. Thus, if diethanolamine is present, a different non-ionic surfactant or an ionic surfactant must be added in accordance with this invention.

According to a further feature of the invention, the use of a hydrocarbon is not necessary, but if present, it is not of the type, concentration and purpose of that described in U.S. Pat. No. 4,508,537. Thus, to the extent that a hydrocarbon is not needed, a preferred aspect of the invention is to omit the type mentioned in the U.S. patent, col. 5, line 55 to column 6, line 8, or for that matter, any type of hydrocarbon whatsoever.

The surfactant may be selected from the group consisting of the following compounds:

(a) a compound of the general formula I:

$$R(OCH_2CH_2)_x-O-R_1 \qquad \text{I}$$

wherein R is hydrogen or alkyl, $R_1$ is alkyl or aryl, preferably hydrocarbon aryl and x is from 8 to 15, an example of compound I being $CH_3-CH_2(OCH_2CH_2)_3-OH$ ethyltrioxyethylene alcohol, (b) a compound of the general formula II:

$$R-X-\overset{\overset{O}{\|}}{C}-R_1 \qquad \text{II}$$

wherein R and $R_1$ are the same as in formula I, and X is oxygen or NH, an example of compound II being $$CH_3-(CH_2)_7-O-\overset{\overset{O}{\|}}{C}-(CH_2)_6-CH_3$$

octyloctanoate (c) a compound of the general formula III:

$$R_2-OSO_3^- M^{30} \qquad \text{III}$$

wherein $R_2$ is alkyl, alkylaryl, preferably alkyl hydrocarbon aryl or $R(OCH_2CH_2)_x$, R and x being the same as in formula I, and M is a monovalent cation, preferably sodium, potassium or ammonium, an example of compound III being $$CH_3-(CH_2)_{11}-OSO_3^- Na^+$$

sodium dodecylsulfate (d) a compound of the general formula IV:

$$\begin{matrix} R_3 \\ \phantom{R} \diagdown \\ \phantom{RRR} CH-OSO_3^- M^+ \\ \phantom{R} \diagup \\ R_4 \end{matrix} \qquad \text{IV}$$

wherein $R_3$ and $R_4$ are hydrogen, alkyl or arylalkyl, preferably hydrocarbona arylalkyl and may be the same or different, with the proviso that if either $R_3$ or $R_4$ is hydrogen, the other is alkyl or arylalkyl, and M is the same as in formula III, an example of compound IV being $$\begin{matrix} CH_3-(CH_2)_5 \\ \phantom{RRRRRR} \diagdown \\ \phantom{RRRRRRRRR} CH-OSO_3^- Na^+ \\ \phantom{RRRRRR} \diagup \\ CH_3-(CH_2)_5 \end{matrix}$$

sodium hexylheptylsulfate (e) a compound of the general formula V:

$$\begin{matrix} & O \\ & \| \\ CH_2-C-O-R_3 \\ | \\ R_5 & O \\ | & \| \\ CH-C-O-R_4 \\ | \\ SO_3^- M^+ \end{matrix} \qquad \text{V}$$

wherein $R_3$, $R_4$ and M are the same as in formula IV, and $R_5$ is a saturated alkyl group containing 0 to 2 carbon atoms, an example of compound V being $$\begin{matrix} & O \\ & \| \\ CH_2-C-O-(CH_2)_7-CH_3 \\ | \\ CH_2 & O \\ | & \| \\ CH_2-C-O-(CH_2)_7-CH_3 \\ | \\ SO_3Na^+ \end{matrix}$$

sodium dioctylsulfosuccinate;

(f) a compound of the general formula VI:

$$R_3-\overset{\overset{O}{\|}}{C}-\underset{\underset{R_4}{|}}{N}-R_5-SO_3^- M^+ \qquad \text{VI}$$

wherein $R_3$, $R_4$, $R_5$ and M are as in formulae IV and V, an example of compound VI being $$CH_3-(CH_2)_7-\overset{\overset{O}{\|}}{C}-NH-C_2H_4-SO_3^- Na^+$$

sodium N-ethylsulfate nonylamide;

(g) a compound of the general formula:

$$\begin{matrix} R_1' \\ \phantom{R} \diagdown \\ R_2'-N \\ \phantom{R} \diagup \\ R_3' \end{matrix} \qquad \text{VII}$$

wherein $R'_1$, $R'_2$, $R'_3$ are the same or different and may be alkyl, alkylaryl, preferably alkyl or hydrogen, with the proviso that $R_1$, $R_2$ and $R_3$ are not all hydrogen, an example of compound VII being $$[HO-(CH_2)_6]_3N$$

trihexanolamine; and (h) a compound of the general formula:

$$\begin{matrix} R_1 \\ \phantom{R} \diagdown \\ R_2-N^+-R_4X^- \\ \phantom{R} \diagup \\ R_3 \end{matrix} \qquad \text{VIII}$$

wherein $R_1$, $R_2$, are the same as in the formula VII, $R_4$ is an alkly or alkylaryl, preferably alkyl and, X is a monovalent anion, an example of compound VIII being $$[CH_3-(CH_2)_5]N^+Cl^-$$

tetrahexylammonium chloride.

Preferred surfactants are sodium dioctyl sulfosuccinate or sodium dodecyl sulfosuccinate.

The concentration of the surfactant preferably is such that it does not affect the flotation properties of the sulfur suspension in the liquor, but only influences the properties of the sulfur particles in the froth after separation of the froth from the liquor.

The surfactant is preferably provided in a concentration of from about 3 parts per million to about 16 parts per million, more preferably about 6–12 parts per million, and particularly about 8–12 parts per million by weight.

The hydrophilic/hypophylic balance (HLB) of the surfactant, as used in this specification, denotes the relative solubility of the surfactant in water to that in oil.

It is desirable that the surfactant has an HLB value of higher than 14, preferably between 14 and 30, and most preferably between 14 and 20.

The HLB value of the surfactant is, of course, influenced by the length of the various R groups defined in the above formulae. In other words, the HLB value of the surfactant should be such be such as to cause the sulfur particles to have adequate but not excessive hydrophilic properties. The purpose of the surfactant is to overcome the natural hydrophobic properties of the sulfur particles in suspension to such an extent that they have a lower tendency to lump together or to adhere to the surfaces of the containers or vessels in which the process is carried out, but not to such an extent that they can no longer be separated from the liquor by air flotation. On the other hand, if the HLB value of the surfactant is such as to make it too hydrophobic, the surfactant will significantly adsorb on the sulfur particles, and this may lead to excessive losses of the surfactant out of the system together with the sulfur particles.

Conveniently, the surfactant is stable at a pH of between 7.8 and 9 and at a temperature of up to 135° C.

The surfactant may be provided in any form which is easily dispersible or soluble in the scrubbing liquor. Thus, the surfactant may be provided as a wetting agent, e.g., a liquid mixture with water and ethanol acting as solvents.

This invention is particularly advantageous in a Sulfolin process which is described in detail in U.S. Pat. No. 4,537,752, issued Aug. 27, 1985 by G. Weber.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, if any, cited above and below, and of corresponding application South African 88/04263, filed June 15, 1988, are hereby incorporated by reference.

Furthermore, in the following examples, DEA means diethanolamine.

EXAMPLES

Example 1

When operating a Sulfolin pilot plant using washing liquor without DEA, it was observed that the sulfur particles in the froth in the oxidizers was crusty and stiff, i.e., low in liquor content and high in sulfur. The sulfur in the slurry tank floated on top of the liquor and formed solid lumps, making it almost impossible to pump it out of the slurry tank to the plate filter.

A wetting agent sold under the name Astrowet 608 in the form of a liquid containing 75% sodium dioctyl sulfosuccinate, 20% water and 5% ethanol was tested in the sulfur removal pilot plant with a liquor of the following composition:

| Total vanadium | 1.36 g/l |
|---|---|
| Alkalinity | 41.8 g/l as $Na_2CO_3$ |
| NaSCN | 6.0 g/l |
| DEA | zero |

As there was no indication of what levels of wetting agent would be required, 2 mg/l Astrowet 600 was added after 99 hours to the oxidizer as a 1% solution, with a further 3 mg/l being added after another 5 hours. The concentration was increased in steps of 4 mg/l at intervals of a few days up to 16 mg/l.

The addition of the 1% solution to the oxidizer initially caused the froth to collapse. However, the froth layer was established again after about three hours when the wetting agent had been properly mixed with the the suction side of the liquor circulating pump, or even better still, directly into the stirred slurry tank.

By observing the behavior of the sulfur in the oxidizer and slurry tank, it was concluded that the optimum concentration of the surfactant was between 8 and 12 mg/l. At 16 mg/l, flotation ceased and the froth in the oxidizer was barren. Increasing the air flow did not restart the sulfur flotation.

Addition of the wetting agent had no observable effect on the absorption or reoxidation stages, but caused a lowering of the pressure in the line between the circulating pump and the venturi from about 370 kPa to about 240 kPa at constant flow rate. The circulating pump functions to circulate regenerated scrubbing solution to the absorber wherein it passes as the motive fluid through venturis thereby drawing in the raw $H_2S$-containing gas.

Example 2

In a second run the liquor had the following initial composition:

| Total vanadium | 1.62 g/l |
|---|---|
| Alkalinity | 40.9 g/l as $Na_2CO_3$ |
| NaSCN | 5.3 g/l |
| DEA | zero |

Addition of 10 mg/l of Astrowet to the liquor caused the viscosity of the liquor at 40° to drop from 0.88 cSt to 0.79 cSt, which probably was the cause of the drop in pressure of the circulating liquor observed in Example 1.

As no analytical method was available for determining this surfactant at these low concentrations, the only way to observe whether the surfactant disappears from the system together with the sulfur was to observe the behavior of the sulfur with time.

During this 380-hour run, the froth layer in the oxidizer was loose and mobile, and the sulfur in the slurry tank settled properly. Flotation was good throughout, and there was virtually no sulfur in the circulating liquor. No adverse consequences of any kind were noted.

From the above observations, it was concluded that Astrowet is stable in the circulating liquor and does not adhere to the sulfur. There is little possibility that at these low levels the surfactant could affect the carbon content of the sulfur.

Towards the end of the run, the behavior of the sulfur was observed to change slightly, with fine sulfur appearing in the circulating liquor. This may indicate that at this stage some topping up of the Astrowet was required, to compensate for some liquor lost with the sulfur cake and for accidental spillages that occur.

Example 3

The liquor loaded into the pilot plant had the following composition:

| Total vanadium | 3.2 g/l |
|---|---|
| Alkalinity | 37.3 g/l as $Na_2CO_3$ |
| NaSCN | 83.5 g/l |
| $Na_2SO_4$ | 47 g/l |
| Residual DEA equivalent | 0 g/l |

The pilot plant was started up at a liquor circulation rate of 2.7-3m³/h and a gas flow rate of about 40 Nm³/h, without addition of surfactant. The froth layer in the oxidizer was 5-10 cm thick. Over the first 144 hours, a 15 cm crust of hard, sticky sulfur built up on the surface of the liquor in the slurry tank. This cake could not be dispersed by stirring. Sulfur was also found coating the inside of the liquor line to the venturi and partially blocking the venturi nozzle.

After 144 hours, Astrowet 608, as a 1% solution in water, was poured into the oxidizer to a final concentration of 4 mg/l. This initially caused the sulfur laden froth layer to decrease to 1 cm, but in a few hours the froth increased again to the normal thickness of 5 cm.

The sulfur cake in the slurry tank was then dispersed with a wooden paddle. The sulfur settled, but because of the large amount involved, it caused a blockage of the line to the slurry pump. The line was cleared and no further blockages of this line were experienced during the remainder of the run, nor was there any further build-up of sulfur on the surface of the liquor in the slurry tank.

After 216 hours, more Astrowet was added, to raise the concentration to 6 mg/l. No change in sulfur behavior was observed; the froth layer in the oxidizer remained at about 5 cm. Sulfur was still found adhering to the walls of the liquor line and in the venturi nozzle.

Increasing the Astrowet concentration to 8 mg/l after 374 hours showed no effect; but upon increasing the level to 10 mg/l after 446 hours a detergent effect was noticed. The flakes of sulfur still adhering to the sides of the slurry tank were coming loose, to float on top of the liquor. Furthermore, the liquor line and the venturi nozzle were now found to be free of sulfur. Flotation in the oxidizer was not affected, as a 5-10 cm sulfur rich froth layer persisted in the oxidizer. The run was terminated after 478 hours.

The effects of surfactant concentration on the sulfur particle size, were determined by a Coulter particle size analyzer. Contrary to expectation, there is a slight increase in particle size with increasing surfactant concentration from 0 to 8 mg/l.

The ratio $V^{5+}$/total V remained between 0.8 to 1.0 for the whole run, while the percentage absorption remained constant. The presence of surfactant has therefore no measurable effect on reoxidation or absorption.

Example 4

By increasing the alkalinity in the circulating liquor of a commercial size Sulfolin plant and by maintaining the pH within the range of 7.8 to 9, it was possible to operate the plant without the addition of diethanolamine (DEA). However, as the concentration of residual DEA decreased over a period of time (as the DEA was gradually converted into breakdown products), the sulfur slurry which overflows from the oxidizers to the slurry tanks started separating in the slurry tanks into a thin slurry and a tough, compact sulfur crust which floated on top of the liquor and gradually became thicker and drier. The agitators in the slurry tanks were unable to mix the crust with the slurry, which resulted in an irregular feed to the decanters. The feed to the decanters varied between a thin slurry and a thick, tough cake, which tended to block the slurry pumps and the decanters. This in turn gave rise to high maintenance costs and lost time while the pumps and decanters were being opened and cleaned. The problem could be alleviated partially by spraying circulating liquor on to the sulfur crust in the slurry tanks. However, this was cumbersome and not very effective.

72 liters of Astrowet (containing 54 kg of solid material) were diluted with steam condensate to a solution containing 1% of solids, and added at the circulating pump of the plant containing a total volume of 13, 500 m³ of circulating liquor. Addition of all the Astrowet solution was calculated to produce a final concentration of about 4 parts per million by mass.

About 15 to 20 minutes after commencement of the Astrowet addition, the flotation of sulfur particles in the oxidizers stopped completely, and a clear liquor overflowed to the slurry tanks. Addition of Astrowet was then suspended after only 7.5 kg (=0.56 parts per million) of solids had been added to the liquor. After about 7 hours, the flotation recommenced spontaneously.

During this period it was noted that, as a result of the addition of the Astrowet, the mobility of the dry sulfur crust in the slurry tanks gradually improved until the entire mass of sulfur in the tanks was in motion.

A few days layer, addition of Astrowet solution in small quantities (1-3 liters at a time, dissolved in 200 liters of steam condensate) by means of a bucket was recommenced, adding the solution directly into the slurry tanks, with intervals of from 4 to 6 hours. Directly after addition of the diluted Astrowet it was noted that air was being liberated from the sulfur crust, which in the meantime had formed again; after about 10 minutes the sulfur level decreased by about 30 to 50 cm. After a further 20 to 30 minutes, the mobility of the crust started improving, but as the sulfur slurry overflowed from the oxidizers to the slurry tanks, the crust started building up again. Addition of Astrowet was resumed until a total of 94 liters (equivalent to about 70.5 g of solids or 5.2 parts per million) had been added. At this stage, the slurry in the slurry tanks was sufficiently mobile for the agitators in the tank to mix the slurry uniformly. During a further 336 hours of operation, no further problems were experienced with the handling properties of the sulfur in the oxidizers.

The average ash and carbon contents of the sulfur product before and after addition of Astrowet were as follows:

| | Before Addition | After Addition |
|---|---|---|
| % Ash | 0.064 | 0.056 |
| Standard deviation | 0.035 | 0.025 |
| % Carbon | 0.023 | 0.014 |
| Standard deviation | 0.021 | 0.011 |

|  | Before Addition | After Addition |
| --- | --- | --- |
| Number of tests | 22 | 10 |

The table shows that both the ash and carbon content had decreased upon addition of Astrowet, but the decreases are probably not significant in view of the large standard deviations.

The sulfur concentration in the feed to the decanters varied between 2 and 12% before addition, and between 4.7 and 7.2% after addition of Astrowet. This indicates a more uniform composition of the slurry in the tanks, as a result of improved mixing.

In a 22-day period preceding the test run, the average plant availability was only 84%, the lost time having been mainly due to mechanical problems with the slurry pumps and decanters, caused by the immobility of the sulfur crust and the lumpiness of the material that broke off from the crust. After the addition of Astrowet, the plant availability was 100%. The sulfur production increased, as a result of the Astrowet addition, from about 6.56 tons per hour to about 8.37 tons per hour.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A method of improving the ease of handling and manipulation of a froth comprising elemental sulfur, said froth having been recovered from a liquor which has been employed to scrub out hydrogen sulfide from a gaseous stream, said method comprising the step of adding to the liquor an ionic or non-ionic surfactant in a sufficient concentration to substantially prevent the froth from becoming crusty and stiff, and in an insufficient concentration to substantially enhance the flotation of sulfur.

2. A method according to claim 1, further comprising preceding steps for the removal of hydrogen sulfide from a gas stream comprising:
   (a) contacting the gas stream in an absorber with a regenerable scrubbing solution adapted to absorb and preferentially oxidize the sulfur of the hydrogen sulfide to particles of elemental sulfur,
   (b) transferring the scrubbing liquor to an oxidizer,
   (c) bubbling an oxygen containing gas through the liquor so as to regenerate the liquor and to cause the sulfur particles to rise upwards through the liquor so as to float thereon as a layer of froth,
   (d) separating the froth layer containing the sulfur particles from the liquor, and a subsequent step of
   (e) returning the liquor to the absorber.

3. A method as claimed in claim 2, in which the surfactant selected has a hydrophilic/lyophilic value from 14 to 30.

4. A method as claimed in claim 2, wherein the liquor is essentially free of diethanolamine.

5. A method as claimed in claim 1, in which the concentration of surfactant in the scrubbing liquor is selected such that the surfactant affects substantially only the properties of the sulfur particles in the froth after separation of the froth from the liquor.

6. A method as claimed in claim 1, in which the concentration of the surfactant in the liquor is from 3 to 16 parts per million by weight.

7. A method as claimed in claim 1, in which the surfactant selected has a hydrophilic/lyophilic balance value higher than about 14.

8. A method as claimed in claim 1, wherein the liquor is essentially free of diethanolamine.

9. A method of improving the ease of handling and manipulation of a froth comprising elemental sulfur, said froth having been recovered from a liquor which has been employed to scrub out hydrogen sulfide from a gaseous stream, said method comprising the step of adding to the liquor an ionic or non-ionic surfactant in a sufficient concentration to substantially prevent the froth from becoming crusty and stiff, in which the surfactant is selected from the group consisting of:

(a) a compound of the formula I:

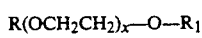

wherein R is hydrogen or an alkyl group, $R_1$ is alkyl or aryl, and x is from 8 to 15, (b) a compound of the formula II:

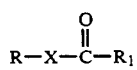

wherein R and $R_1$ are the same as in formula I, and X is oxygen or NH, (c) a compound of the formula III:

wherein $R_2$ is alkyl, alkylaryl or $R(OCH_2CH_2)_x$, R and x being the same as in formula I, and M is a monovalent cation, (d) a compound of the formula IV:

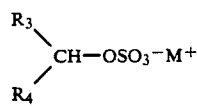

wherein $R_3$ and $R_4$ are hydrogen, alkyl or arylalkyl and may be the same or different, with the proviso that if either $R_3$ or $R_4$ is hydrogen, the other is alkyl or arylalkyl, and M is a monovalent cation, (e) a compound of the formula V:

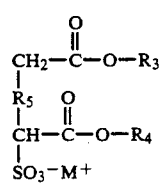

wherein $R_3$ and $R_4$ are the same as in formula IV, M is a monovalent cation, and $R_5$ is a saturated alkyl group containing from 0 to 2 carbon atoms;

(f) a compound of the formula VI:

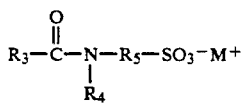

wherein R₃, R₄, R₅ and M are as in formulae IV and V;

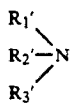

wherein R'₁, R'₂, R'₃ are the same or different and may be alkyl, alkylaryl or hydrogen, with the proviso that R₁, R₂ and R₃ are not all hydrogen; and (h) 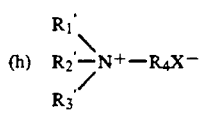

wherein R'₁, R'₂, R'₃, are the same as in the formula VII, R₄ is an alkyl or alkylaryl group and X is a monovalent anion.

10. A method according to claim 9, wherein said concentration is insufficient to substantially enhance flotation of the sulfur particles.

11. A method as claimed in claim 9, in which the surfactant is sodium dioctyl sulfosuccinate.

12. A method as claimed in claim 9, in which the surfactant is sodium dodecyl sulfosuccinate.

13. A method as claimed in claim 9, in which the concentration of the surfactant in the liquor is from 6 to 12 parts per million by weight.

14. A method as claimed in claim 9, in which the surfactant selected has a hydrophilic/lyophilic value from 14 to 20.

15. A method of improving the ease of handling and manipulation of a froth comprising elemental sulfur, said froth having been recovered from a liquor which has been employed to scrub out hydrogen sulfide from a gaseous stream, said method comprising the step of adding to the liquor an ionic or non-ionic surfactant in a sufficient concentration to substantially prevent the froth from becoming crusty and stiff, and further comprising preceding steps for the removal of hydrogen sulfide from a gas stream comprising:

(a) contacting the gas stream in an absorber with a regenerable scrubbing solution adapted to absorb and preferentially oxidize the sulfur of the hydrogen sulfide to particles of elemental sulfur, (b) transferring the scrubbing liquor to an oxidizer, (c) bubbling an oxygen containing gas through the liquor so as to regenerate the liquor and to cause the sulfur particles to rise upwards through the liquor so as to float thereon as a layer of froth, (d) separating the froth layer containing the sulfur particles form the liquor, and a subsequent step of (e) returning the liquor to the absorber, in which the surfactant is selected from the group consisting of:

(a) a compound of the formula:

$$R(OCH_2CH_2)_x\text{—}O\text{—}R_1 \qquad \text{I}$$

wherein R is hydrogen or an alkyl group, R₁ is alkyl or aryl, and x is from 8 to 15, (b) a compound of the formula II:

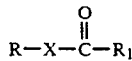

wherein R and R₁ are the same as in formula I, and X is oxygen or NH, (c) a compound of the formula III:

$$R_2\text{—}OSO_3^-M^+ \qquad \text{III}$$

wherein R₂ is alkyl, alkylaryl or R(OCH₂CH₂)$_x$, R and x being the same as in formula I, and M is a monovalent cation, (d) a compound of the formula IV:

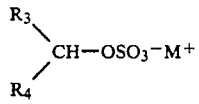

wherein R₃ and R₄ are hydrogen, alkly or arylalkyl and may be the same or different, with the proviso that if either R₃ or R₄ is hydrogen, the other is alkyl or arylalkyl, and M is a monovalent cation, (e) a compound of the formula V:

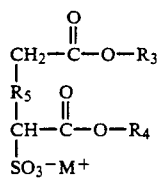

wherein R₃ and R₄ are the same as in formula IV, M is a monovalent cation, and R₅ is a saturated alkyl group containing from 0 to 2 carbon atoms;

(f) a compound of the formula VI:

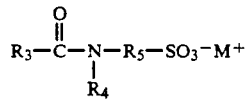

wherein R₃, R₄, R₅ and M are as in formulae IV and V;

wherein R'₁, R'₂, R'₃ are the same or different and may be alkyl, alkylaryl or hydrogen, with the proviso that R₁, R₂ and R₃ are not all hydrogen; and (h) 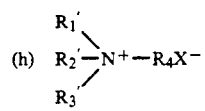

wherein $R'_1$, $R'_2$, $R'_3$ are the same as in the formula VII, $R_4$ is an alkyl or alkylaryl group and X is a monovalent anion.

16. A method as claimed in claim 15, in which the surfactant is sodium dioctyl sulfosuccinate.

17. A method as claimed in claim 15, in which the surfactant is sodium dodecyl sulfosuccinate.

18. A method as claimed in claim 15, in which the concentration of the surfactant in the liquor is from 8 to 12 parts per million.

19. A method as claimed in claim 18, wherein the scrubbing liquor is essentially free of hydrocarbon and diethanolamine.

20. A method of improving the ease of handling and manipulation of a froth comprising elemental sulfur, said froth having been recovered from a liquor, said method comprising the step of adding to the liquor
    sodium dioctyl sulfosuccinate or
    sodium dodecyl sulfosuccinate, either sulfosuccinate being in a concentration sufficient to substantially prevent the froth from becoming crusty and stiff.

21. A method of improving the ease of handling and manipulation of a froth comprising elemental sulfur, said froth having been recovered from a liquor which has been employed to scrub out hydrogen sulfide from a gaseous stream, said method comprising the step of adding to the liquor an ionic or non-ionic surfactant in a sufficient concentration to substantially prevent the froth from becoming crusty and stiff, in which the surfactant is selected from the group consisting of:

(a) a compound of the formula I:

$$R(OCH_2CH_2)_x-O-R_1 \quad \text{I}$$

wherein R is hydrogen or an alkyl group, $R_1$ is alkyl or aryl, and x is from 8 to 15, (b) a compound of the formula II:

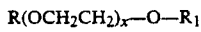
$$R-X-\overset{O}{\overset{\|}{C}}-R_1 \quad \text{II}$$

wherein R and $R_1$ are the same as in formula I, and X is oxygen or NH, (c) a compound of the formula III:

$$R_2-OSO_3^-M^+ \quad \text{III}$$

wherein $R_2$ is alkyl, alkylaryl or $R(OCH_2CH_2)_x$, R and x being the same as in formula I, and M is a monovalent cation, (d) a compound of the formula IV;

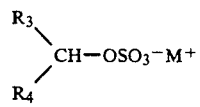
$$\begin{array}{c}R_3 \\ \diagdown \\ CH-OSO_3^-M^+ \\ \diagup \\ R_4\end{array} \quad \text{IV}$$

wherein $R_3$ and $R_4$ are hydrogen, alkyl or arylalkyl and may be the same or different, with the proviso that if either $R_3$ or $R_4$ is hydrogen, the other is alkyl or arylalkyl, and M is a monovalent cation, (e) a compound of the formula V:

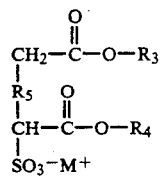
$$\begin{array}{c}O\\ \|\\ CH_2-C-O-R_3\\ |\\ R_5 \quad O\\ |\quad \|\\ CH-C-O-R_4\\ |\\ SO_3^-M^+\end{array} \quad \text{V}$$

wherein $R_3$ and $R_4$ are the same as in formula IV, M is a monovalent cation, and $R_5$ is a saturated alkyl group containing from 0 to 2 carbon atoms;

(f) a compound of the formula VI:

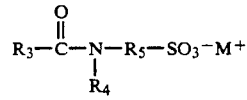
$$\begin{array}{c}O\\ \|\\ R_3-C-N-R_5-SO_3^-M^+\\ |\\ R_4\end{array} \quad \text{VI}$$

wherein $R_3$, $R_4$, and $R_5$ and M are as in formulae IV an V;

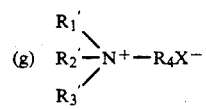
(g) $\begin{array}{c}R_1'\\ \diagdown\\ R_2'-N^+-R_4X^-\\ \diagup\\ R_3'\end{array} \quad \text{VIII}$ wherein $R'_1$, $R'_2$, $R'_3$ are the same or different and may be alkyl, alkylaryl or hydrogen, with the proviso that $R'_1$, $R'_2$ and $R'_3$ are not all hydrogen, $R_4$ is an alkyl or alkylaryl group and X is a monovalent anion.

22. A method of improving the ease of handling and manipulation of a froth comprising elemental sulfur, said froth having been recovered from a scrubbing liquor employed to scrub out hydrogen sulfide from a gaseous stream,
    said method comprising the step of adding to the liquor an ionic or non-ionic surfactant in a concentration sufficient to substantially prevent the froth from becoming crusty and stiff and wherein the scrubbing liquor is essentially free of hydrocarbon and diethanolamine.

23. A method according to claim 22, wherein said concentration is insufficient to enhance flotation of the sulfur particles.

* * * * *